United States Patent Office 2,921,847
Patented Jan. 19, 1960

2,921,847

IRON CHELATES OF ETHYLENE BIS(ALPHA-IMINO - ORTHO - HYDROXYPHENYLACETIC ACID) AND METHOD OF OVERCOMING IRON DEFICIENCIES IN GROWING PLANTS THEREWITH

Martin Knell and Harry Kroll, Warwick, R.I., assignors to Geigy Chemical Corporation, a corporation of Delaware No Drawing. Application October 10, 1955
Serial No. 539,693

15 Claims. (Cl. 71—1)

This invention is that of the ferrous and ferric chelates of ethylene bis(alpha-imino-ortho-hydroxyphenyl acetic acid) (the acid form being briefly denoted APCA), and their respective alkali metal and ammonium salts. Also part of the invention are compositions of matter containing as an essential active ingredient any of these iron-APCA chelates and such salts of them, as well as mixtures of any of these chelates and of their salts, and of any of both the chelates and such salts.

Ethylene bis(alpha-imino-ortho-hydroxyphenyl acetic acid) is illustrated by the following structural formula:

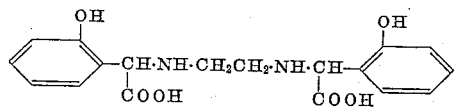

Then, its ferric chelate (the HFe chelate of Examples 2 and 3 below) may be illustrated by the following suggested structural formula:

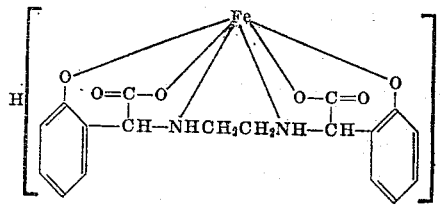

Also, its dihydrogen ferrous chelate (the H₂Fe-APCA chelate of Example 4 below) can be visualized, for example, by the proposed structural formula:

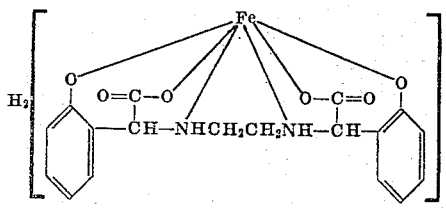

Similarly, the respective mono- or di-alkali metal or -ammonium salts of these iron chelates (prepared according to Example 5 below), may be correspondingly illustrated. Thus, for example, the mono- or di-sodium salt of the ferrous chelate, can be visualized in relation to the last of the foregoing suggested structural formulae, by replacing one of the hydrogens on the left of the left-hand bracket by one atom or any of these alkali metals or the ammonium radical for the mono-alkali metal or -ammonium salt, or thus replacing both of these hydrogens by two atoms of the alkali metal or by the ammonium radical taken twice for the di-salt.

The invention includes also compositions containing especially the ferric-APCA chelate and these salts of it, which compositions are effective for the correction of iron deficiencies in growing plants, as well as the methods of correcting deficiencies of essential metals, such as iron deficiency, in growing plants by use especially of the ferric-APCA chelate and these salts of it or compositions containing this chelate or these salts or mixtures of any of them.

In iron chlorosis (the plant malnutrional condition due to iron deficiency of various economic crops) the area of the leaf between its veins is a marked yellow green in contrast to the dark green of the veins. In advanced iron deficiency, this contrast is lacking and instead the leaves have an ivory color, the plants become partially defoliated, and as a terminal result, will die. Such iron deficiency may be due to any of several factors. Some of these are (1) an actual deficiency of iron in the soil, (2) high manganese and copper contents of the soil, and (3) an alkaline soil (pH above 7.0), such as by the presence of a high soil content of calcium carbonate.

Iron chelates of ethylene diamine tetraacetic acid (briefly called EDTA) have been tried and used successfully, in central Florida, in alleviating mild to extreme conditions of iron chlorosis occurring in its orange and grapefruit groves. Despite the overcoming of the deleterious effects of iron deficiencies by applying iron-EDTA, its widespread use to maintain a normal state of iron balance in economic crops has been limited. This limitation results from its tendency to produce burns on contacting the fruit and leaves of the plant, and its inability, when used in economic amounts, to overcome iron chlorosis of plants grown in alkaline soils.

In most cases where plants are grown in alkaline, calcareous soils, applications of Fe-EDTA to the soil are economically ineffective. In applying it as a spray to plants grown on such soils, its effectiveness in alleviating the iron deficiency has been only moderate when used in amounts which are effective on plants grown in more acid soils.

It has been estimated that forty percent of the citrus plants in Florida suffer from marginal deficiencies of iron. However, maintenance application of iron-EDTA is not practiced on them, despite the prospect of increased yields and improved quality of the crop. This is so because in either spray or soil application, contact of the iron-EDTA chelate with the fruit produces burns as well as premature dropping of unripe as well as of ripe fruit, and a down-grading of what otherwise might be considered normal fruit, with resultant economic loss to the grower.

Subsequently, but in an earlier part of the investigation leading to the invention herein, the iron chelate of diethylene-triamine pentaacetic acid (briefly called DTPA) was used. It not only equals iron-EDTA chelate in remedying chlorosis in iron deficient plants growing in acidic soils, but also iron-DTPA chelate lacks its shortcomings and is more effective in alkaline soils while at the same time being much less toxic to the treated plant.

The iron-APCA chelates of this invention, including their various salts described herein, likewise lack the various shortcomings of iron-EDTA. However, in marked contrast to the latter, iron-APCA chelate also is even unusually more effective than iron-DTPA in overcoming, and also avoiding the development of, chlorosis in plants growing in alkaline, e.g. calcareous, soils.

Ferric-APCA was mixed with Millville, Utah, calcareous soil (pH 7.9), in the proportion of ten parts per million of soil. Iron-EDTA was mixed with more of the same soil in the same proportion. Chlorosis susceptible soybean plants were planted in each of the two thus mixed soils. Severe chlorosis developed in the plants grown on the iron-EDTA treated soil, but those grown on the ferric-APCA treated soil developed normal and green.

Iron-APCA is not adsorbed by the soil when added to various alkaline soils having a high clay content. However, each of iron-EDTA, iron-DTPA, and monosodium ferrous N-hydroxyethylethylene diamine triacetic acid (briefly denoted sodium ferrous-HEEDTA) added separately to such soil is irreversibly adsorbed, and in the more alkaline soil breaks down to a hydrated iron oxide and respectively EDTA, DTPA, and monosodium-HEEDTA.

Iron-APCA is many times more effective in introducing iron into plant tissue than either iron-EDTA or iron-DTPA, or sodium ferrous-HEEDTA, in plants growing in alkaline soils.

A separate solution was prepared respectively of each of the chelates, (1) monosodium ferric-APCA, (2) monosodium iron-EDTA, (3) disodium iron-DTPA, and (4) ferric chloride as a control, in each of which the iron was isotopically labelled $Fe^{59}$ and ten milliliters equalled ten milligrams of iron (showing approximately five microcuries activity), and an equimolar amount of the respective ligand (as to the first three solutions).

A ten milliliter aliquot of each of these four solutions was mixed thoroughly respectively with one pint of each of two different soils, namely, (a) East Coast Florida soil of pH 7.7 and (b) a Utah calcareous soil of pH 7.5. Then four lima bean plant seeds were allowed to germinate and grow in each of these twelve treated soil portions. Four replications were employed.

After about a month's growth, the resulting plants were harvested, dried, and separated into primary leaves, foliate leaves, and stem. Each of the separate sections was then ground in a Wiley mill through a number twenty screen. Then about two-tenths to four-tenths gram samples of each respectively were weighed into standard 15 x 125 millimeter test-tubes, and their radioactive counting rate determined by inserting each test-tube into the well of a Nuclear Chemical Corporation Model DS-3 scintillation counter. The count rate in each sample was translated into micrograms of iron by comparison with an aliquot of the respective original iron-chelate or ferric chloride solution. The resulting concentration of iron (in parts per million) in each of the plants, due to the use of the respective iron chelate or ferric chloride in each of the two soils is shown in the following table:

FLORIDA SOIL SAMPLES

| Agent Used | NaFe-APCA | NaFe-EDTA | Na₃Fe-DTPA | FeCl₃ (control) |
|---|---|---|---|---|
| Plant Parts: | | | | |
| Primary Leaf | 138 | 3 | 5 | 4 |
| Trifoliate | 79 | 12 | 2 | 16 |
| Stem | 36 | 2 | 2 | 4 |

UTAH SOIL SAMPLES

| | | | | |
|---|---|---|---|---|
| Primary Leaf | 123 | 3 | 15 | 5 |
| Trifoliate | 125 | 6 | 14 | 10 |
| Stem | 55 | 4 | 4 | 3 |

A separate solution of each of the three chelates and the ferric chloride used in the preceding test was similarly prepared so that ten milliliters equalled five milligrams of iron. Such solution was also prepared of sodium iron-HEEDTA. Then, by the same procedure as in the prior test, the translocating of iron from samples of these alkaline Florida and Utah soils to bean plants grown in these soils was determined. The iron found in the trifoliate leaves of these bean plants is given, similarly in parts per million of dry trifoliate leaves, in the following table:

| Compound | Iron in trifoliate leaves of bean plants | |
|---|---|---|
| | Florida Soil | Utah Soil |
| Control | 6 | 5 |
| EDTA | 10 | 19 |
| HEEDTA | 12 | 26 |
| DTPA | 9 | 52 |
| APCA | 137 | 122 |

Moreover, while iron-DTPA is less phytotoxic than iron-EDTA, and sodium iron-HEEDTA, the iron-APCA chelates have inordinately the highest phyto-therapeutic index than the other substances that have been used. In view of the foregoing, the iron-APCA chelates can be applied in proportions of up to one thousand parts per million parts of soil (i.e. up to one-tenth percent of the soil) with no phytotoxicity. Yet each of iron-EDTA, the iron chelates of hydroxyethyl ethylenediamine triacetic acid (briefly called HEEDTA), and iron-DTPA is phytotoxic at a far lower concentration.

A wide variety of plants and vegetation can be treated with the iron-APCA chelates, with favorable results, and especially so on iron deficient and also alkaline and chalcareous soils. Such plants and vegetation include deciduous fruit plants, stone fruits, vegetables, ornamental flowers and shrubs, and grasses. All citrus plants that exhibit a chlorotic condition, whether grown on acid, alkaline or neutral soils, respond favorably to the iron-APCA chelates. Among them are grapefruit, oranges, tangerines, lemons and limes, and particularly those grown on alkaline soils. Chlorotic avocados and pineapples also have been favorably treated.

The invention, insofar as it involves the various iron-APCA chelates including their respective alkali metal and ammonium salts, is illustrated by, but not restricted to, the following examples, together with the preparation of the starting ethylene bis(alpha-imino-ortho-hydroxyphenylacetic acid):

*Example 1.*—Preparation of ethylene bis(alpha-imino-ortho-hydroxyphenylacetic acid):

(a) Ethylene bis(alpha-imino-ortho-hydroxyphenyl-acetonitrile): 3.66 kilograms (30 moles) of salicylaldehyde and 22.5 liters of ethylene chloride were placed in a fifty liter three-necked flask, fitted with stirrer, condenser and dropping funnel. 1032 grams (15 moles) of ethylenediamine (87.4%) were added dropwise at a rate to allow the temperature to rise to, and not to exceed, 31° C. After the addition was completed, the temperature was increased to cause refluxing to remove by azeotropic distillation the water formed in the reaction. After the water was completely removed, the reaction mixture was cooled to 20° C. and 1730 milliliters (1212 grams, 45 moles) of hydrogen cyanide were added at a fairly rapid rate. In about one and one-half hours after its complete addition, a yellow solid separated out. Stirring was continued for four and one-half hours, and the reaction mixture then let stand at room temperature overnight. The separated out product then was filtered off and washed with one gallon each of ethylene chloride and ether. Then after air drying, the product weighed 4427 grams (91.6% yield) with a neutral equivalent (by perchloric acid titration) of 166 (theoretical 161).

(b) Ethylene bis(alpha - imino - ortho - hydroxyphenyl-acetic acid) monoamide dihydrochloride: 7000 milliliters of concentrated hydrochloric acid were placed in a 12 liter flask fitted with a stirrer. 1400 grams of ethylene bis(alpha-imino-ortho-hydroxyphenyl acetonitrile), prepared in (a), were added portionwise while stirring, keeping the temperature below 30° C. After complete addition of the nitrile, the temperature was increased to 40° C. and in a few minutes a solid precipitated from the homogeneous mixture. The mixture was warmed at 40–45° C. for four hours, after which the product was filtered off and washed with acetone until no further color was removed. The product, after air drying, weighed 1636 grams (87% yield). *Analysis*: N(amide) 3.4, N(total) 9.4, chlorine 16.6, neutral equivalent (by KOH in dimethylformamide) 108, calculated for $C_{18}H_{23}O_5N_3Cl_2$: N(amide) 3.2, N(total) 9.7; chlorine 16.4; neutral equivalent (non-aqueous) 108.

(c) Ethylene bis(alpha - imino - ortho - hydroxyphenyl acetic acid) dihydrochloride: 3 kilograms of the monoamide dihydrochloride prepared in (b) were transferred to a 50 liter flask and five gallons of distilled water were added. The mixture was warmed to 80–90° C., at which time the solid was dissolved completely. The solution was stirred for two hours, after which 42 pounds of concentrated hydrochloric acid were added portionwise. A solid started to precipitate 15 to 30 minutes after complete addition of the hydrochloric acid. The stirring and heating of the heterogeneous mixture were continued for four hours and then it was cooled to room temperature. The product was filtered off and washed with acetone and ether (one gallon of each) and air dried. The yield was 5 pounds 2 ounces (75.8% yield).

Alternatively this dihydrochloride was prepared from the acetonitrile of (a) above as follows: 5 grams of the acetonitrile were added a mixture of 60 milliliters of water and 20 milliliters of concentrated hydrochloric acid. The homogenerous mixture was warmed on a steam bath (80–90° C.) for 22 hours, during which time a white precipitate formed (the precipitate began forming after 5 hours). The precipitate was filtered off and washed with 25 milliliter portions of water and acetone and dried at 90° C. The product isolated, weighed 4 grams (60% yield), was ethylene bis(alpha-imino-ortho-hydroxyphenylacetic acid) dihydrochloride.

(d) Ethylene bis(alpha - imino - ortho-hydroxyphenyl-acetic acid) or APCA: 9 lbs. 10 ounces of di-hydrochloride prepared as in (c) above were transferred to a 15 gallon crock fitted with stirrer, pH meter, and dropping funnel. The solid was slurried with nine gallons of distilled water, and enough 50% sodium hydroxide was added to adjust from pH 0.8 to 4 to 4.5, requiring about 900 milliliters. The product, after being washed with water and acetone and air dried, weighed 7 pounds 14 ounces (89% yield) and had a neutral equivalent (perchloric acid) of 185 (theoretical 180). Titration in ethylenediamine, using potassium hydroxide in methanol, gave a neutral equivalent of 91.8 (theoretical 90).

*Example 2.*—Ferric chelate of ethylene bis(alpha-imino-ortho-hydroxyphenylacetic acid) (called the HFe chelate): 21.6 grams (0.05 mole) of the mono-amide di-hydrochloride obtained according to Example 1 (c) above were slurried in one hundred milliliters of water, and 13.5 grams of ferric chloride hexahydrate (0.05 mole) were then added, which produced an immediate deep purple color. Eight grams (0.2 mole) of sodium hydroxide were then added and the resulting exothermic reaction was cooled indirectly. After the reaction was over, the dark solid product was filtered off and dried in a vacuum desiccator, over phosphoric anhydride. Thus, 20.7 grams of the HFe chelate product were obtained, which had the following analysis:

| | Percent |
|---|---|
| Water | 5.8 |
| Sodium chloride | 14.1 |
| Purity (determined colorimetrically) | 73.0 |

The yield of HFe chelate based on the colorimetric analysis was 73%.

*Example 3.*—HFe chelate from ethylene bis(alpha-imino-ortho-hydroxyphenylacetic acid): Six kilograms (16.66 moles) of ethylene bis(alpha-imino-ortho-hydroxyphenylacetic acid) were dissolved in a solution of two kilograms (49.98 moles) of sodium hydroxide in thirty liters of water in a fifty liter flask fitted with a stirrer. To this solution there was added while stirring a solution of 4.9 grams (16.66 moles) of ferric chloride hexahydrate. The heterogeneous mixture formed was stirred for one hour and then filtered through a large ceramic filter crock. The reddish purple solid was washed with two gallons of water and allowed to air dry overnight. The solid was then transferred to trays and dried in a vacuum oven at 75° C. for two days. Fourteen pounds of the desired HFe–APCA were obtained. It assayed as follows:

| | Percent |
|---|---|
| Water | 7.6 |
| Sodium chloride | 6.3 |
| Iron (total) | 10.66 |
| Purity (based on total Fe) | 79 |
| Purity (determined colorimetrically) | 75 |

The yield of this HFe chelate based on the colorimetric analysis was 70%.

*Example 4.*—Dihydrogen ferrous chelate of ethylene bis(alpha-imino-ortho-hydroxyphenylacetic acid): 278 grams (one mole) of ferrous sulfate heptahydrate were dissolved in a minimum amount of hot water and 360 grams (one mole) of ethylene bis(alpha-imino-ortho-hydroxyphenylacetic acid) were added portionwise, with a minimum of contact with air, preferably under an atmosphere of nitrogen to minimize oxidation to the ferric form. As the chelating agent dissolved, a deep red colored solution developed and a reddish purple precipitate formed. After the addition was complete, the reaction mixture was heated with stirring at 90° C. for 3 hours, cooled and filtered. In this manner, 380 grams (92% yield) of the dihydrogen ferrous-APCA chelate were obtained.

*Example 5.*—The alkali metal and ammonium iron-APCA chelates: Any of the corresponding alkali metal and ammonium iron chelates of APCA can be prepared by converting its ferric chelate to the mono-alkali metal or mono-ammonium salt, or its ferrous chelate to the di-alkali metal or di-ammonium salt, by treatment with the corresponding molal equivalent of the required alkali metal or ammonium hydroxide thus:

(a) The HFe chelate, i.e. the monohydrogen ferric-APCA chelate, of Example 3 is converted to its corresponding monosodium ferric-APCA chelate by treating an aqueous slurry of the monohydrogen chelate with one molal equivalent of sodium hydroxide, for example, dissolved in a minimum amount of water, and separating the resulting monosodium ferric-APCA chelate. This chelate can be separated, for example, by evaporating the reaction mixture to dryness. In like manner, by replacing the sodium hydroxide in this procedure by the corresponding molal equivalent of potassium hydroxide or of any other alkali metal hydroxide or of ammonium hydroxide, there is obtained similarly the corresponding mono-potassium, or mono-(other alkali metal), or mono-ammonium, ferric-APCA chelate.

(b) The $H_2Fe$ chelate, i.e. the dihydrogen ferrous-APCA chelate, of Example 4, is converted to its corresponding disodium ferric-APCA chelate by treating an aqueous slurry of the dihydrogen ferrous chelate with two molal equivalents of sodium hydroxide, for example, dissolved in a minimum amount of water, and separating the resulting disodium ferrous-APCA chelate, say, by evaporating the reaction mixture to dryness. In like manner, by replacing the sodium hydroxide is this procedure by the corresponding molal equivalent of potassium hydroxide or of any other alkali metal hydroxide or of ammonium hydroxide, there is obtained similarly the corresponding di-potassium, or di-(other alkali metal), or di-ammonium, ferrous-APCA chelate.

Similarly, by using one molal equivalent of one of the alkali metal hydroxides together with one molal equivalent of any other such metal, or ammonium, hydroxide, there is obtained similarly the corresponding di-(mixed alkali metal), or mono(alkali metal) mono-ammonium ferrous-APCA chelate, for example, sodium potassium ferrous-APCA chelate, or sodium ammonium ferrous-APCA chelate, or potassium ammonium ferrous-APCA chelate.

The compositions of matter embraced by the invention comprise any suitable mixture of any of the iron-APCA chelates, whether a ferrous or ferric chelate, and/or of any of these alkali metal or ammonium salts of any of them, with or without APCA itself. The compositions of matter of the invention also comprise the APCA and preferably any of these iron chelates of it and of these salts of any of its iron chelates dispersed in an innocuous vehicle for it.

Such vehicle can be an inert solid carrier such as any innocuous sand as vermiculite and others. It can be a solid carrier that is also useful to the plant or vegetation, such as a fertilizer or other plant food. It can be an aqueous or other inert and innocuous liquid vehicle, in which the APCA and/or any of its iron chelates and/or any of the alkali metal or ammonium salts of it or of any of its iron chelates are dissolved or otherwise dispersed.

Any of these herein described compositions of matter of the invention can be prepared in administration units to facilitate application of the substances to the chlorotic or chlorosis-susceptible plants to be treated. An advantageous administration unit contains from one one-hundredth to fifty percent of the iron-APCA chelate and/or any of its alkali metal or ammonium salts in uniform admixture with any of the foregoing described vehicles. Use of such an administration unit not only enables an appropriate dose easily to be administered to the plant to be treated but enables administration by soil application to be done in uniform manner.

An advantageous administration unit form comprises an intimate admixture of the selected chelate material of the invention with a so-called balanced fertilizer or, in suitable circumstances, with other plant food or fertilizer compositions. These also can be uniformly applied, e.g. by a mechanical spreader. Still another advantageous administration unit form comprises a solution of the iron-APCA chelate (or any of the indicated salts of it) in a suitable liquid, such as water or an aqueous nutrient solution. This administration form enables controlled application by foliage spraying, and the like. The various administration unit forms may, if desired, comprise other inert or innocuous active materials.

The iron-APCA, as the free acid or any of its above-mentioned salts, may be applied to the plants or vegetation in any of a wide variety of ways. Presently-preferred methods of application are shown by the following:

A. *Soil applications*

(1) As a dry powder to the soil surface.
(2) In solution to the soil surface.
   (a) For citrus tree, ⅓ pound of the iron-APCA chelate and/or any of the noted salts of it in 5 gallons of water per tree.
   (b) For crop land, 20 pounds of the iron-APCA chelate and/or any of the noted salts of it per 200 gallons of water per acre.
(3) In the dry form admixed with an inert carrier.
   (a) ⅓ pound iron-APCA chelate and/or any of the noted salts of it admixed with said per citrus tree.
(4) In dry form admixed with suitable fertilizer.
   (a) For citrus trees, ⅓ pound iron-APCA chelate and/or any of the noted salts of it plus admixed with 4 and ⅔ pounds of fertilizer such as a 13–0–13 (N–P–K) analysis fertilizer per tree.
   (b) For azaleas, 1 pound iron-APCA chelate and/or any of the noted salts of it admixed with 99 pounds of fertilizer such as a 27–9–9 (N–P–K) analysis fertilizer, and apply to 300 square feet.

B. *Foliage applications*

(1) As a thorough cover spray containing 1 to 4 pounds iron-APCA chelate and/or any of the noted salts of it per 100 gallons of water.
(2) As a thorough cover spray containing 1 to 4 pounds of iron-APCA chelate and/or any of the noted salts of it plus other chelated minor elements at recommended rates per 100 gallons of water.
(3) As a thorough cover spray containing 1 to 4 pounds of iron-APCA chelate and/or any of the noted salts of it plus insecticides and/or fungicides at recommended rates.
(4) Combination of 2 and 3 above.

C. *Injection applications*

(1) Injection in solution into stems or trunks or plants.
(2) Injection in dry form into stems or trunks of plants.

D. *Seed treatment*

Treatment of seeds of annual and perennial plants with a solution, slurry or dry powder.

Representative examples illustrating the employment of the compositions of the invention in correcting iron deficiencies in growing plants follow:

*Example 6.*—Iron deficient Eureka lemon trees growing on a sandy clay loam soil are treated with ½ pound of monosodium ferric-APCA chelate per tree, applied alone to the surface of the soil beneath the trees. The iron-APCA is eventually dissolved in the moisture of the soil, and the resultant aqueous solution contains the ferric iron in a form which is available to the tree roots. It is advantageous, after the application of the iron-APCA chelate, thoroughly to water the soil down to a depth of at least 6 inches, thereby to bring the chelate closer to the tree roots. Five weeks or less after the application, correction of the iron deficiency is apparent, as evidenced, inter alia, by the elimination of yellow areas from the foliage and the appearance of new dark green growth.

*Example 7.*—Iron deficient lemon trees are treated per tree, with ½ pound of the ferric-APCA chelate mixed uniformly with ½ pound of sand. The mix is applied to the soil surface, the inert sand facilitating uniform application. Correction of the iron deficiency is noted in the manner mentioned in Example 6.

*Example 8.*—A solution of ½ pound of the ferric-APCA chelate in 10 gallons of water is applied to the soil beneath an iron deficient apple tree. Correction of the deficiency is obtained in a period of about four weeks.

*Example 9.*—Soil application with a uniform mixture of ⅓ pound of the ferric-APCA chelate and 5 pounds of sand (6.2% HFe-APCA by weight) per tree corrects iron deficiency in orange trees within a period of about 5 weeks.

*Example 10.*—Iron deficient orange trees are treated with ⅓ pound of the ferric-APCA chelate plus 4 and ⅔ pounds of a 13–0–13 (N–P–K) fertilizer (6.6% HFe-APCA by weight) per tree. The material is applied to the soil beneath the trees by a fertilizer distributor. Correction of the iron deficiency is obtained in five weeks.

*Example 11.*—Iron deficient azaleas are treated with a uniform mixture of the ferric-APCA chelate and 99 pounds of a 27–9–9 (N–P–K) fertilizer (1.0% HFe-APCA by weight) as a soil application to 300 square feet. Correction of the iron deficiency is noted within a few weeks.

*Example 12.*—Iron deficient pasture is treated with 36 pounds of the ferric-APCA chelate in admixture with 800 pounds of a 5–10–10 (N–P–K) fertilizer (4.3% HFe-APCA by weight), as a soil application to one acre.

Correction of the deficiency is noted within four weeks.

*Example 13.*—Iron deficient peach trees were given a thorough cover spray with a solution of 2 pounds of the ferric-APCA chelate in 100 gallons of water (0.24% HFe-APCA by weight). This foliage application resulted in correction of the iron deficiency within about four weeks.

*Example 14.*—The ferric-APCA chelate was used in a conventional nutrient solution at a concentration of 100 parts per million (0.01% HFe-APCA by weight). Tomato plants grown in this solution showed no iron deficiency symptoms, whereas those grown in an identical nutrient solution containing no iron-APCA showed severe iron deficiency.

In respectively like manner to that of any of the Examples 6 through 14, correspondingly similar results were obtained when the HFe-APCA chelate was replaced in those examples by the respectively same weight of the monosodium or the mono-potassium or mono-ammonium salt of the ferric-APCA chelate, or of the disodium or di-potassium or di-ammonium salt of the ferrous-APCA chelate. In each of the applications of the chelate to the soil in any of these examples, it is advantageous, although not requisite, to water in the agent applied to the soil.

In place of the azaleas of Example 11, its method, or the method of some of the other examples, can be used on any other ornamental bushes or plants. These include, among others, camelias, cherry laurel, chrysanthemum, ornamental citrus, carnations, gardenias, gladioli, hibiscus, holly, hydrangeas, ixora, ligustrum, *Pieris japonica*, rhododendrons, roses, snap-dragons, etc., also ornamental trees and large shrubs such inter alia as magnolia pin oak, Russian olive, sandcherry, spruce, etc.

The APCA chelates of this invention can be used in the treatment of iron-deficient lawns, essentially in the manner of Example 12. Vegetables which may be treated with an iron-APCA, for example, in the form of side-dressing applications and in admixture with a fertilizer, and applied 4 weeks after planting comprise cabbage, corn, peppers, watermelons (18 to 36 pounds of the chelate per acre); snapbeans, carrots, cauliflower, eggplant (18 pounds per acre); summer squash (36 pounds per acre); and others.

The expression "di(mixed alkali metal)" in certain of the appended claims is intended to cover the replacement in the dihydrogen ferrous chelate of one of the hydrogens by one alkali metal and the replacement of the other hydrogen by a different alkali metal, as described in column 7, lines 1–9 hereof and referred to at lines 4–5 thereof by the expression "di-(mixed alkali metal)."

While the invention has been described in relation to certain specific embodiments of it, it is understood that various substitutions and modifications can be made in the individual examples within the scope of the appending claims which are intended also to cover the equivalents of the specific embodiments.

This application is a continuation-in-part of our originally co-pending (now abandoned) application Serial No. 358,558 filed March 29, 1953.

What is claimed is:

1. An iron chelate of ethylene bis(alpha-imino-ortho-hydroxyphenylacetic acid).

2. A ferric chelate of ethylene bis(alpha-imino-ortho-hydroxyphenylacetic acid).

3. An iron chelate of ethylene bis(alpha-imino-ortho-hydroxyphenylacetic acid) which is a member of the class consisting of the monohydrogen ferric chelate, the mono(alkali metal) ferric chelate, the mono-ammonium ferric chelate, the dihydrogen ferrous chelate, the di-(alkali metal) ferrous chelate wherein both alkali metal cations are alike, the di-ammonium ferrous chelate, the di(alkali metal) ferrous chelate wherein one alkali metal cation differs from the other, and the mono(alkali metal) mono-ammonium ferrous chelate.

4. A ferrous chelate of ethylene bis(alpha-imino-ortho-hydroxyphenylacetic acid).

5. A composition of matter effective in overcoming iron deficiencies in growing plants, which composition comprises from about one one-hundredth to about fifty percent by weight of at least one iron chelate of ethylene bis(alpha-imino-ortho-hydroxyphenylacetic acid).

6. A composition of matter as claimed in claim 5, wherein the iron chelate is a member of the class consisting of the hydrogen ferric chelate, the mono(alkali metal) ferric chelate, the mono-ammonium ferric chelate, the dihydrogen ferrous chelate, di(alkali metal) ferrous chelate wherein both alkali metal cations are alike, the di-ammonium ferrous chelate, the di(mixed alkali metal) ferrous chelate, and the mono(alkali metal) mono-ammonium ferrous chelate.

7. A composition of matter effective in overcoming iron deficiencies in growing plants, which composition comprises from about one one-hundredth to about fifty percent by weight of at least one iron chelate of ethylene bis(alpha-imino-ortho-hydroxyphenylacetic acid), which chelate is a member of the class consisting of the hydrogen ferric chelate, the mono(alkali metal) ferric chelate, the mono-ammonium ferric chelate, the dihydrogen ferrous chelate, di(alkali metal) ferrous chelate wherein both alkali metal cations are alike, the di-ammonium ferrous chelate, the di(alkali metal) ferrous chelate wherein one alkali metal differs from the other, and the mono-(alkali metal) mono-ammonium ferrous chelate; and a vehicle which is inert to the chelate and also innocuous to the plant.

8. The composition as claimed in claim 7, wherein the vehicle is water.

9. A composition of matter effective in overcoming iron deficiencies in growing plants, which composition contains in an aqueous vehicle from about one one-hundredth to above fifty percent by weight of at least one iron chelate of ethylene bis(alpha-imino-ortho-hydroxyphenylacetic acid), which chelate is a member of the class consisting of the hydrogen ferric chelate, the mono(alkali metal) ferric chelate, the mono-ammonium ferric chelate, the dihydrogen ferrous chelate, di(alkali metal) ferrous chelate wherein both alkali metal cations are alike, the di-ammonium ferrous chelate, the di(mixed alkali metal) ferrous chelate, and the mono(alkali metal) mono-ammonium ferrous chelate.

10. The composition as claimed in claim 9, wherein the aqueous vehicle has dissolved in it also a water-soluble nutrient for the plant.

11. The composition as claimed in claim 7, wherein the vehicle is solid.

12. A composition of matter effective in overcoming iron deficiencies in growing plants, which composition contains in an aqueous vehicle (*a*) from about one one-hundredth to about fifty percent by weight of at least one iron chelate of ethylene bis(alpha-imino-ortho-hydroxyphenylacetic acid), which chelate is a member of the class consisting of the hydrogen ferric chelate, the mono-(alkali metal) ferric chelate, the mono-ammonium ferric chelate, the di-hydrogen ferrous chelate, di(alkali metal) ferrous chelate wherein both alkali metal cations are alike, the di-ammonium ferrous chelate, the di(alkali metal) ferrous chelate wherein one alkali metal differs from the other, and the mono(alkali metal) mono-ammonium ferrous chelate; and (*b*) at least one member of the class consisting of a plant insecticide and a plant fungicide.

13. A preparation effective in overcoming iron deficiencies in growing plants, which preparation comprises a plant fertilizer composition and from about one one-hundredth to about fifty percent by weight of at least one iron chelate of ethylene bis(alpha-imino-ortho-hydroxypenylacetic acid), which chelate is a member of the class consisting of the hydrogen ferric chelate, the mono(alkali metal) ferric chelate, the mono-ammonium ferric chelate, the di-hydrogen ferrous chelate, di(alkali metal) ferrous chelate wherein both alkali metal cations are alike, the di-ammonium ferrous chelate, the di(alkali metal) ferrous chelate wherein one alkali metal differs from the other, and the mono(alkali metal) mono-ammonium ferrous chelate; and a vehicle which is inert to the chelate and also innocuous to the plant.

14. The method of overcoming an iron deficiency in a growing plant which comprises administering to the plant an iron chelate of ethylene bis(alpha-imino-ortho-hydroxyphenylacetic acid) and in a quantity sufficient to overcome such deficiency.

15. The method of correcting an iron deficiency in a growing plant, as claimed in claim 14, wherein the iron chelate administered to the plant is a member of the class consisting of the hydrogen ferric chelate, the mono-(alkali metal) ferric chelate, the mono-ammonium ferric chelate, the dihydrogen ferrous chelate, di(alkali metal) ferrous chelate wherein both alkali metal cations are alike, the di-ammonium ferrous chelate, the di(mixed alkali metal) ferrous chelate, and the mono(alkali metal) mono-ammonium ferrous chelate.

No references cited.

UNITED STATES PATENT OFFICE
CERTIFICATE OF CORRECTION

Patent No. 2,921,847

January 19, 1960

Martin Knell et al.

It is hereby certified that error appears in the printed specification of the above numbered patent requiring correction and that the said Letters Patent should read as corrected below.

Column 1, line 68, for "or" read -- of --; column 4, line 29, for "chalcareous" read -- calcareous --; column 5, line 29, after "follows:" insert -- to --; line 32, for "homogenerous" read -- homogenous --; same column 5, line 37, for "weighed" read -- weighing --; column 6, line 64, for "ferric-" read -- ferrous- --; line 70, for "is this" read -- in this --; column 7, line 69, for "said" read -- sand --; column 8, line 21, for "or", second occurrence, read -- of --; column 9, lines 32 and 33, after "magnolia" insert a comma; line 50, for '"di-(mixed alkali metal)."' read -- "di-(mixed alkali metal)". --.

Signed and sealed this 8th day of November 1960.

(SEAL)
Attest:

KARL H. AXLINE
Attesting Officer

ROBERT C. WATSON
Commissioner of Patents